US011163393B2

(12) United States Patent
Alexandre et al.

(10) Patent No.: US 11,163,393 B2
(45) Date of Patent: Nov. 2, 2021

(54) DEVICE FOR LOCATING AN IMPACT AGAINST AN INTERACTIVE SURFACE, CORRESPONDING FACILITIES, METHOD AND COMPUTER PROGRAM

(71) Applicant: Commissariat a l'energie atomique et aux energies alternatives, Paris (FR)

(72) Inventors: Jean-Marc Alexandre, Verrieres-le-Buisson (FR); Robert Boden, Dourdan (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 16/337,204

(22) PCT Filed: Sep. 18, 2017

(86) PCT No.: PCT/FR2017/052483
§ 371 (c)(1),
(2) Date: Mar. 27, 2019

(87) PCT Pub. No.: WO2018/060564
PCT Pub. Date: Apr. 5, 2018

(65) Prior Publication Data
US 2019/0227690 A1 Jul. 25, 2019

(30) Foreign Application Priority Data

Sep. 27, 2016 (FR) ...................................... 1659133

(51) Int. Cl.
| *F41J 5/056* | (2006.01) |
| *G01L 1/14* | (2006.01) |
| *G06F 17/13* | (2006.01) |
| *G06F 3/041* | (2006.01) |
| *F41J 5/14* | (2006.01) |

(52) U.S. Cl.
CPC .......... *G06F 3/04144* (2019.05); *F41J 5/056* (2013.01); *G01L 1/146* (2013.01); *F41J 5/14* (2013.01); *G06F 17/13* (2013.01)

(58) Field of Classification Search
CPC .................................. F41J 5/056; G01L 1/146
See application file for complete search history.

(56) References Cited

U.S. PATENT DOCUMENTS 4,409,899 A * 10/1983 Owen ..................... G01S 11/16
102/211
5,062,641 A * 11/1991 Poillon .................... F41J 5/056
473/155

(Continued)

FOREIGN PATENT DOCUMENTS

| AU | 436959 | 6/1973 |
| DE | 27 38 213 A1 | 7/1978 |
| WO | WO 2012/104767 A2 | 8/2012 |

OTHER PUBLICATIONS

International Search Report dated Dec. 8, 2017 in PCT/FR2017/052483 filed Sep. 18, 2017.

*Primary Examiner* — William Boddie
*Assistant Examiner* — Bipin Gyawali
(74) *Attorney, Agent, or Firm* — Oblon, McClelland, Maier & Neustadt, L.L.P.

(57) ABSTRACT

A device for locating an impact against an interactive surface includes at least three transducers distributed against the interactive surface and an electronic central unit programmed to locate the impact by analysing propagation time differences of progressive mechanical waves from the impact to the transducers on the basis of instants of impact detection identified in the electrical signals supplied by the transducers. The electronic central unit is programmed to trigger an impact detection from a first instant when at least one M-th derivative from at least one of the received (Continued)

Figure 1:
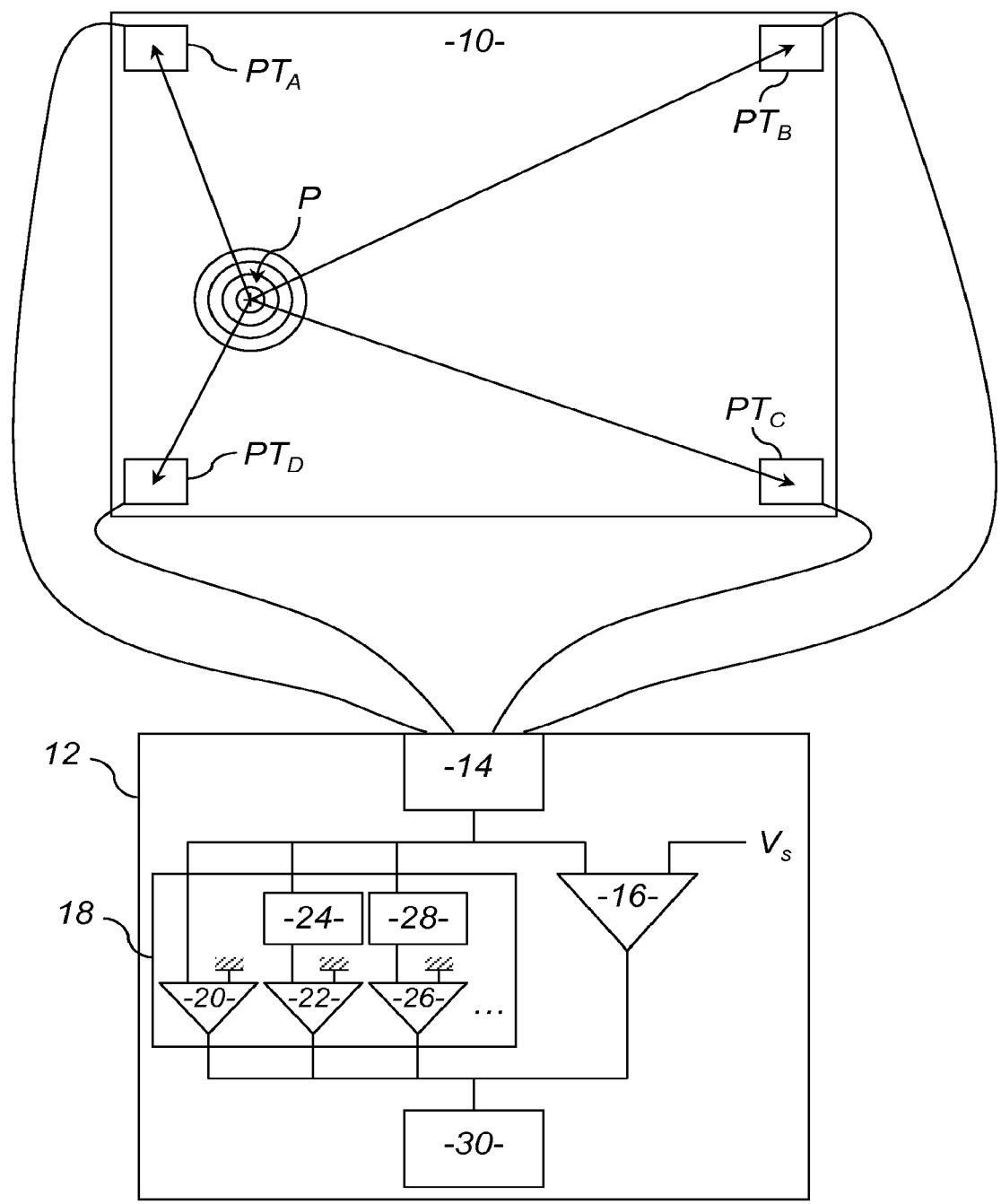

electrical signals exceeds a predetermined non-zero threshold value and for then determining, for each electrical signal received from each transducer, at least one second instant, subsequent to the first instant, of the first zero crossing of at least one N-th derivative of this electrical signal, from which is identified at least one instant of impact detection.

11 Claims, 3 Drawing Sheets

(56) References Cited

U.S. PATENT DOCUMENTS

| | | | |
|---|---|---|---|
| 6,367,800 | B1 | 4/2002 | Sheck et al. |
| 6,933,930 | B2 | 8/2005 | Devige et al. |
| 7,088,347 | B2 | 8/2006 | Iisaka et al. |
| 7,345,677 | B2 | 3/2008 | Ing et al. |
| 7,643,015 | B2 * | 1/2010 | Paradiso ............... G06F 3/0433 345/177 |
| 8,330,744 | B2 | 12/2012 | Nikolovski et al. |
| 9,004,490 | B2 * | 4/2015 | Kazakov .................... F41J 5/14 273/372 |
| 9,423,254 | B2 * | 8/2016 | Waters ............... G01C 19/5705 |
| 10,190,854 | B2 * | 1/2019 | Gracia Elizondo ........ F41J 5/02 |
| 10,974,121 | B2 * | 4/2021 | Thornbrue ............. G01C 21/00 |
| 2013/0304401 | A1 | 11/2013 | Tubaro et al. |
| 2014/0151965 | A1 * | 6/2014 | Garas ........................ F41J 5/06 273/371 |
| 2014/0367918 | A1 * | 12/2014 | Mason .................... F41J 5/056 273/371 |
| 2017/0072226 | A1 * | 3/2017 | Matsui ................. B06B 1/0253 |

* cited by examiner

DEVICE FOR LOCATING AN IMPACT AGAINST AN INTERACTIVE SURFACE, CORRESPONDING FACILITIES, METHOD AND COMPUTER PROGRAM

This invention relates to a device for locating an impact against an interactive surface, by analysing time differences of the propagation of progressive mechanical waves propagating from the impact. It also relates to facilities that comprise this device, a method that implements it and a corresponding computer program.

Many objects with an interactive surface are known, in particular display devices, mobile telephones or other mobile personal digital assistance devices. Their interface is in general a flat and rectangular screen with which a user can interact using a projectile, a stylus or even a finger. Note however that the invention applies more generally to any type of object that has an interactive surface that can propagate progressive mechanical waves from an impact, this surface not necessarily being flat, or with a rectangular contour.

The term interactive surface means a two-dimensional or three-dimensional surface, capable of changing shape within the meaning of the elastic and static elasticity of the materials when it is subjected to an impact such as a touch, a force of contact, a mechanical pulse or an impact, by thus allowing the propagation of progressive mechanical waves that can be detected using transducers, in particular surface acoustic waves, from the location of the impact. The surface deformation can be submillimetric that cannot be perceived by the unaided eye. Surfaces made from plastic, glass or metal are suitable.

Each one of the known objects with an interactive surface comprises a device for locating impacts using one or several detection techniques. A strong trend in the reduction of the manufacturing cost and in the reduction of the size aims to retain only the simplest technologies that use a limited number of sensors. The invention thus relates more precisely to a device for locating that implements a technology for detecting the propagation of progressive mechanical waves in an interactive surface, in particular using detectors of the piezoelectric transducer type.

A first solution is disclosed in U.S. Pat. No. 7,345,677 B2. It is based on the recognition of the position of an impact by learning. The method implemented uses a cross-correlation between at least one measured acoustic signal from the detection of an acoustic wave generated by an impact on the interactive surface of the object and a reference set referred to as "a signature set" formed from pre-recorded pulse acoustic responses, with each one relating to a predefined position that is sought to be associated with a function and recognised when an impact is carried on this position.

A second solution, for example disclosed in U.S. Pat. No. 8,330,744 B2, consists in measuring the disturbance of an impact on the propagation of progressive mechanical waves emitted regularly in the interactive surface independently of this impact. This solution is considered to be more precise and reliable that the preceding one, in particular in order to qualify or follow the impact, but it is also based on a recognition of the position of an impact by learning.

These first two solutions have the disadvantage of depending on this learning which can be both complex to implement and quickly unusable in case of variations in the medium or in the interactive surface. They furthermore require rather substantial computing power.

A third, older solution is based on the measurement of a difference in transit time of a wave packet generated by an impact to a plurality of piezoelectric detectors and on the deterministic calculation, using a pre-established mathematical formula, of the position of an emitting source of the wave packet. Thus, this solution requires a device for locating an impact that comprises:
  at least three transducers arranged and distributed against the interactive surface, designed to capture the progressive mechanical waves propagating in the interactive surface and to transform them into electrical signals, and
  an electronic central unit, connected to the transducers in order to receive their electrical signals, programmed to locate the impact in the interactive surface by analysing propagation time differences of progressive mechanical waves from the impact to the transducers on the basis of instants of impact detection identified in the electrical signals received.

Generally, it is then possible to locate a one-off impact of a finger or object (for example a projectile or a stylus), since the latter is then an emitter of a pulse. But with this rather old technology, although advantageously simple, it is difficult to achieve good locating precision, in particular beyond certain dimensions of the interactive surface or when the impact is of low intensity, because it is then delicate to precisely identify the instants of detection of impact in the electrical signals transmitted to the electronic central unit.

For example, if the method for identifying the instants of detection of impact is based on the exceeding of predetermined threshold in the signals returned by the transducers, this generates a measuring error once the returned signals are not of the same amplitudes, which is inevitable in light of the generally high attenuation of progressive waves and of the different distances between the impact and the various transducers. The instant of impact detection will be delayed in the most attenuated signals returned by the transducers that are the farthest from the impact. Moreover, the predetermined threshold is mandatorily common to all of the transducers since no hypothesis can be made a priori on the location of an impact and therefore on the respective amplitudes of the signals returned. It is generally chosen at a few tens of millivolts in order to prevent any false detection on the ambient noise.

Concretely, for an interactive surface made of steel, the slope of the rising signal of the waves is about 80 mV/µs. If the difference in amplitude between two signals from two transducers is a factor of two (the first having a rising slope at 80 mV/µs), this results, for a trigger threshold at 20 mV, in an error of about 250 ns. Since the waves propagate at a speed of 5500 m/s, this gives a locating error of about 1.5 mm.

In practice, in order to attenuate the locating error, a wide band pre-amplification, a squaring, a peak detection, an integration (using a high resistor at the transducer output) and a frequency-selective amplification can be carried out at the output of the transducers, such as for example taught in U.S. Pat. No. 6,933,930 B2. This results in a stronger amplitude of the returned signals and a better adaptation to the later processing in the case of a detection based on the obtaining of an energy threshold. But substantial measurement errors subsist when the impact is close to the periphery of which the transducers form the vertices because the differences in amplitudes between the signals are substantial and the integration times differ. U.S. Pat. No. 6,933,930 B2 therefore teaches to correct these integration times by attempting to evaluate them in order to subtract them from the detection instants. But the resulting processing, which in particular requires an analogue/digital conversion is rather complex and hardly robust.

U.S. Pat. No. 6,367,800 B1 proposes an amplification followed by a resonator stage centred on 25 kHz, making it possible to amplify the signal over a given frequency. This method which can be very precise is however not robust. The choice of a resonance frequency makes the system sensitive to variations in the frequency profile of the signal that can vary according to the energy of the impact, its direction and the nature of the object at the origin of the impact.

As for the methods that consist in digitising the signals at the output of the transducers, such as for example taught in U.S. Pat. No. 7,088,347 B2, before any processing and possible normalizing, the problem is that they require very high analogue/digital conversion frequencies and memory and computing capacities in light of the speed of the progressive mechanical waves in the interactive surface.

It can thus be sought to design a device for locating an impact that makes it possible to overcome at least one portion of the aforementioned problems and constraints.

A device for locating an impact against an interactive surface able to propagate progressive mechanical waves from the impact is therefore proposed, comprising:

at least three transducers arranged and distributed against the interactive surface, designed to capture the progressive mechanical waves propagating in the interactive surface and to transform them into electrical signals, and an electronic central unit, connected to the transducers in order to receive their electrical signals, programmed to locate the impact in the interactive surface by analysing propagation time differences of progressive mechanical waves from the impact to the transducers on the basis of instants of impact detection identified in the electrical signals received, wherein the electronic central unit is programmed to:

trigger an impact detection from a first instant when at least one M-th derivative from at least one of the received electrical signals exceeds a predetermined non-zero threshold value, where M is a positive integer or zero, and after triggering the impact detection:

determining, for each electrical signal received from each transducer, at least one second instant, subsequent to the first instant, of the first zero crossing of at least one N-th derivative of this electrical signal, where N is a positive integer or zero, and identifying, for each electrical signal received from each transducer, at least one instant of impact detection in this electrical signal from said at least one second determined instant.

It has indeed been observed that, surprisingly, although the rising slopes of the signals returned by the transducers are highly dependent on the distances between the impact and the transducers, this is not the case afterwards with the first zero crossings of the signals, or of their successive derivatives, when they have exceeded the predetermined threshold value. Thus, by proceeding in two simple steps as taught hereinabove, the instant of impact detection can be identified robustly in the signals returned by the transducers. Note moreover that the exceeding of a threshold value and the detection of a zero crossing can be carried out on analogue signals, in such a way that the implementation of this invention does not require any analogue/digital conversion.

Optionally, each transducer is a piezoelectric sensor having a capacitor and an output load mounted in parallel such that:

the output load is purely resistive and its impedance is less than one tenth of the impedance of the capacitor at an average frequency of the progressive mechanical waves from the impact, or the output load comprises an operational amplifier mounted as a current/voltage converter.

Also optionally, the electronic central unit is programmed to trigger the impact detection by memorising sampled values of at least one signal from at least one zero comparator of said at least one N-th derivative of each electrical signal received from each transducer, during a predetermined maximum duration.

Also optionally, the electronic central unit is programmed to:

determine, for each electrical signal received from each transducer, several second instants of first zero crossings of several n-th derivatives of this electrical signal, $0 \leq n \leq N$, where N is strictly positive, identify, for each electrical signal received from each transducer, several instants of impact detection in this electrical signal from the determined second instants, and deduce therefrom several possible locations of the impact and determine a final location by averaging and/or optimisation of a likelihood criterion.

Also optionally, a device for locating an impact according to the invention can comprise at least four transducers arranged and distributed against the interactive surface, the electronic central unit furthermore being programmed to:

from at least one determined location of the impact, determine, geometrically and by knowing a propagation speed of the progressive mechanical waves in the interactive surface, expected theoretical instants of impact detection by each one of the transducers, compare the theoretical instants of impact detection to the identified instants of impact detection, and deduce therefrom a likelihood value of said at least one location.

A sports shooting facility is also proposed comprising:

a target with an interactive surface, a device for locating an impact according to the invention, for the determining of location values of impacts against the interactive surface of the target, a server for storing said location values of impacts, an emitter, for the transmitting of said location values of impacts from the electronic central unit of the device for locating to the storage server, and a portable device for telephony or personal digital assistance provided with a software application for the downloading and processing of at least one portion of the location values of impacts stored by the server for the purpose of presenting them to a user.

An archery shooting facility is also proposed comprising:

a target with an interactive surface, a device for locating an impact according to the invention, and at least one arrow of which one end intended to reach the interactive surface of the target is provided with a tip for damping the impact.

Optionally, the target comprises:

a first plate, for example formed from straw or from dense foam, on a front face of which is displayed a marker of the target, and a second transparent protective plate arranged against the front face of the first plate, this second transparent protective plate comprising the interactive surface and having a visual marking allowing for a centring with respect to the marker of the target.

A method for locating an impact against an interactive surface able to propagate progressive mechanical waves from the impact is also proposed, comprising the following steps:

capturing, using at least three transducers arranged and distributed against the interactive surface, the progressive mechanical waves propagating in the interactive surface and transforming them into electrical signals, and locating the impact in the interactive surface, using an electronic central unit connected to the transducers in order to receive their electrical signals, by analysing propagation time differences of progressive mechanical waves from the impact to the transducers on the basis of instants of impact detection identified in the electrical signals received, the locating of the impact comprising the following steps:

triggering an impact detection from a first instant when at least one M-th derivative from at least one of the electrical signals received by the electronic central unit exceeds a predetermined non-zero threshold value, where M is a positive integer or zero, and after triggering the impact detection:

determining, for each electrical signal received from each transducer, at least one second instant, subsequent to the first instant, of the first zero crossing of at least one N-th derivative of this electrical signal, where N is a positive integer or zero, and identifying, for each electrical signal received from each transducer, at least one instant of impact detection in this electrical signal from said at least one second determined instant.

A computer program that can be downloaded from a communication network and/or recorded on a support that can be read by a computer and/or executed by a processor is also proposed, comprising instructions for the execution of the steps of a method for locating an impact according to the invention, when said program is executed on a computer.

Figure 2:
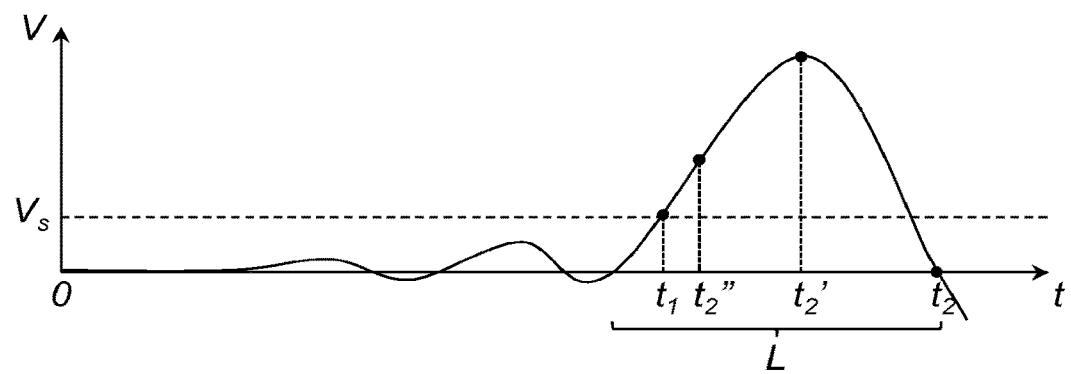
Figure 3:
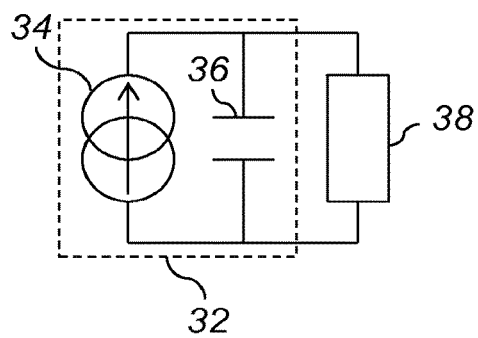
Figure 4:
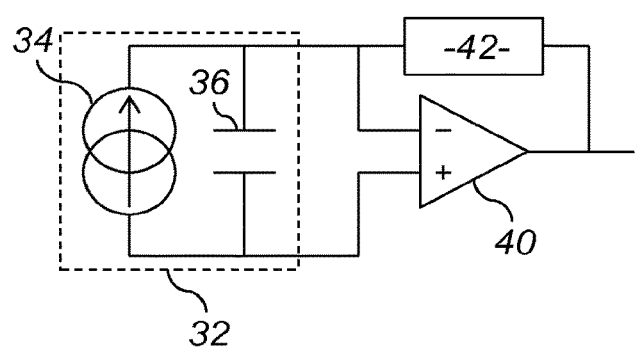
Figure 5:
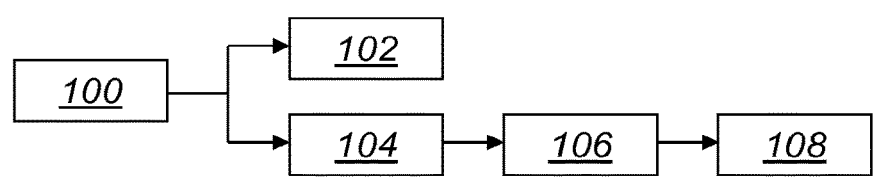
Figure 6:
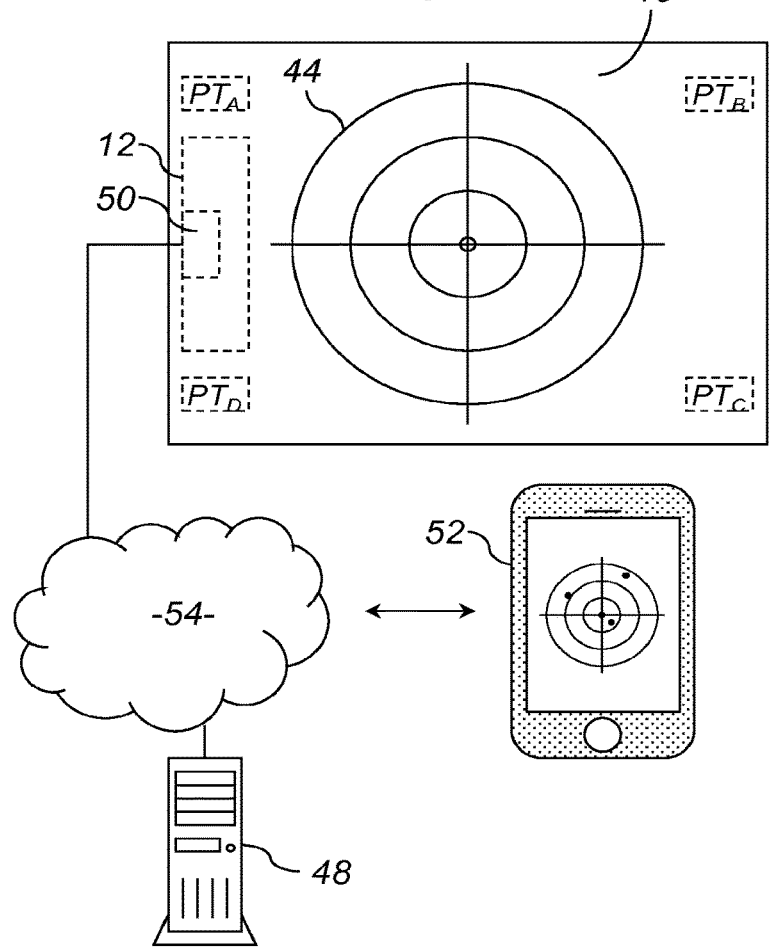
Figure 7:
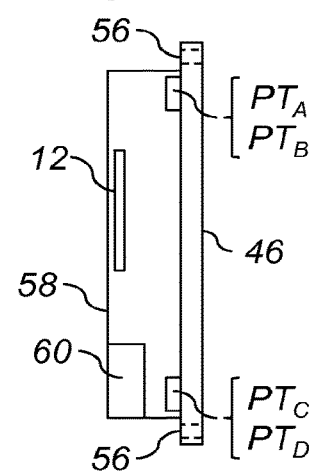
Figure 8:
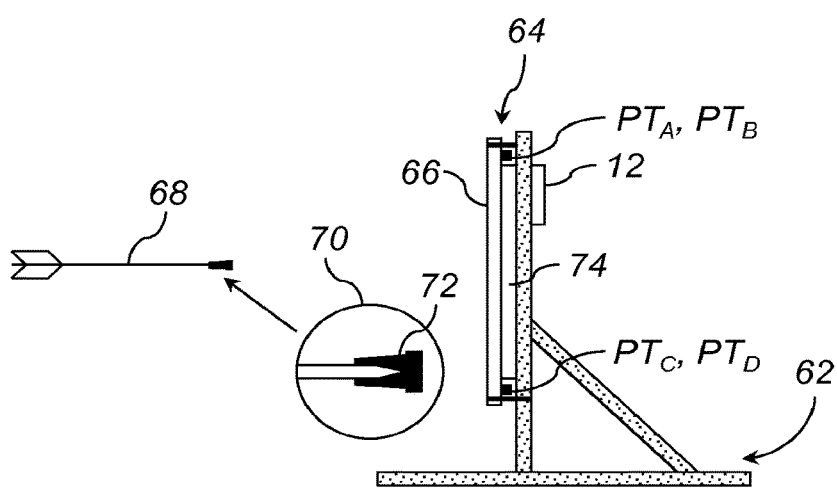

The invention shall be better understood using the following description, provided solely as an example and in reference to the accompany drawings wherein:

FIG. 1 diagrammatically shows the general structure of a facility comprising a device for locating an impact according to an embodiment of the invention, FIG. 2 shows the temporal form of an electrical signal returned by a transducer of the device for locating of FIG. 1 during an impact, FIGS. 3 and 4 show two embodiments of a transducer of the device for locating of FIG. 1, FIG. 5 shows the successive steps of a method for locating an impact according to an embodiment of the invention, FIG. 6 diagrammatically shows a sports shooting facility according to an embodiment of the invention, FIG. 7 is a side view of a target with an interactive surface of the sports shooting facility of FIG. 6, and FIG. 8 diagrammatically shows an archery shooting facility according to an embodiment of the invention.

The facility diagrammatically shown in FIG. 1 comprises a rectangular interactive surface 10, able to propagate progressive mechanical waves from an impact P, and a device for locating any impact against this interactive surface 10.

The device for locating comprises:

four transducers $PT_A$, $PT_B$, $PT_C$ and $PT_D$ arranged and distributed against the interactive surface 10, more precisely at the four corners of the rectangle that it forms, designed to capture the progressive mechanical waves propagating in the interactive surface and to transform them into electrical signals, and an electronic central unit 12, connected to the transducers $PT_A$, $PT_B$, $PT_D$ and $PT_D$ in order to receive their electrical signals, programmed to locate the impact P in the interactive surface 10 by analysing time differences of propagation of progressive mechanical waves from the impact P to the transducers $PT_A$, $PT_B$, $PT_C$ and $PT_D$ on the basis of instants of detection of impact P identified in the electrical signals received.

Note that, in general, the interactive surface 10 is of any shape, not necessarily rectangular. The number of transducers is also indifferent, at least equal to three in order to allow for a locating by analysis of the time differences of propagation as taught in document U.S. Pat. No. 6,933,930 B2 or U.S. Pat. No. 6,367,800 B1.

The electronic central unit 12 more precisely comprises an interface 14 for receiving electrical signals supplied by each one of the four transducers $PT_A$, $PT_B$, $PT_C$ and $PT_D$. This interface can comprise an analogue amplifier.

The electronic central unit 12 further comprises a comparator 16 between a non-zero predetermined threshold value $V_s$ and at least one M-th derivative from at least one of the received electrical signals and transmitted by the interface 14, where M is a positive integer or zero. In the non-limiting example shown in FIG. 1, M=0 and the signals that the comparator 16 receives are directly the electrical signals received and transmitted by the interface 14. But M could be different from 0 in such a way that the signals that the comparator 16 receives could be derivatives of the electrical signals received and transmitted by the interface 14.

The electronic central unit 12 further comprises a module 18 for detecting the zero crossing of at least one N-th derivative of each electrical signal received and transmitted by the interface 14, where N is a positive integer or zero. In the non-limiting example of FIG. 1, this module for detecting 18 comprises three comparators and two derivators. A first comparator 20 directly compares (N=0) each electrical signal received and transmitted by the interface 14 with a zero voltage. A second comparator 22 compares each first derivative (N=1) of each electrical signal received and transmitted by the interface 14 with a zero voltage. To do this, each electrical signal received and transmitted by the interface 14 is processed by a derivator 24 before it is supplied to the second comparator 22. Finally, a third comparator 26 compares each second derivative (N=2) of each electrical signal received and transmitted by the interface 14 with a zero voltage. To do this, each electrical signal received and transmitted by the interface 14 is processed by a double derivator 28 before it is supplied to the third comparator 26. Although this is not shown in FIG. 1, the module for detecting 18 could comprise on the same principle other comparators associated with other derivators for the detecting of zero crossings of N-th derivatives, N≥3, of the signals received and transmitted by the interface 14. Alternatively, it could also comprise less than three comparators, in particular at least a single comparator for carrying out only a single detection of zero crossing for each electrical signal received and transmitted by the interface 14, whether on the signal itself or any one of its derivatives.

The electronic central unit 12 further comprises a calculator 30 of which the digital inputs are connected to the outputs of the comparators 16, 20, 22 and 26. This calculator 30 is for example a microprocessor programmed to:

trigger an impact detection from a first instant $t_1$ when the comparator 16 detects at least one exceeding of the predetermined threshold value $V_s$, and after triggering the impact detection at the instant $t_1$:

determining, for each electrical signal received from each transducer, three second instants $t_2$, $t_{2'}$ and $t_{2''}$, subsequent to the first instant, respectively of the first zero crossing of this electrical signal ($t_2$=instant when the comparator 20 detects a first zero crossing by decreasing values), of its first derivative ($t_{2'}$=instant when the comparator 22 detects a first zero crossing by decreasing values) and of its second derivative ($t_{2''}$=instant when the comparator 26 detects a first zero crossing by decreasing values), and identifying, for each electrical signal received from each transducer, three instants of impact detection in this electrical signal from the three second determined instants $t_2$, $t_{2'}$ and $t_{2''}$.

More precisely, the digital inputs sample the received signals and are for example sequenced by the internal clock of the calculator 30 (in particular using peripheral devices such as microcontroller "timers"). The usual sampling frequencies today range from 60 MHz to more than 200 MHz. As soon as the instant $t_1$ is detected by the digital input receiving the output of the comparator 16, a memorisation of the other digital inputs receiving the outputs of the comparators 20, 22 and 26 is carried out at a sampling frequency during a predetermined maximum duration. This maximum duration is defined in such a way as to be sufficient to consider that all of the first zero crossings of the N-th derivatives considered will take place before the expiration thereof: it is therefore understood that it is defined according to the propagation speed of the progressive mechanical waves and of the lateral dimensions of the interactive surface 10. In practice, a duration of 50 µs or less can be sufficient for an interactive surface with lateral dimensions less than 30 cm wherein the progressive mechanical waves propagate at 5500 m/s.

The instants $t_1$, $t_2$, $t_{2'}$ and $t_{2''}$ are shown in FIG. 2 in the same signal returned by any of the transducers $PT_A$, $PT_B$, $PT_C$ and $PT_D$ during an impact P. This signal has a few micro-oscillations of very low amplitudes preceding a main lobe that is characteristic of the impact P and followed by other oscillations that are attenuated. The instant $t_1$ is that of the exceeding of the predetermined threshold value $V_s$. The latter is chosen in such a way as to exceed the noise and the micro-oscillations preceding the impact P represented by the main lobe L of the signal shown, generally around 10 mV. It is used to detect the rising edge of this main lobe L. The instant $t_2$ is that of the first zero crossing by descending values of the main lobe L. The instant $t_{2'}$ is that of the first zero crossing by descending values of the first derivative of the main lobe L, i.e. the maximum of the main lobe L. The instant $t_{2''}$ is that of the first zero crossing by descending values of the second derivative of the main lobe L, i.e. the first inflection point by increasing values of the main lobe L. The property that is cleverly used by this invention is that the instants $t_2$, $t_{2'}$ and $t_{2''}$ are clearly less dependent on the distances between the impact P and the transducers $PT_A$, $PT_B$, $PT_C$, $PT_D$ than the instant $t_1$. This property is due to the fact that they are linked to characteristic points of the main lobe L that do not depend on the amplitude of the signal, contrary to the instant $t_1$.

In a preferred embodiment, it is the instants $t_2$, $t_{2'}$ and $t_{2''}$ of the zero crossings themselves which are identified as instants of impact detection P by the electronic central unit 12.

Moreover, according to a possible embodiment, the instant $t_1$ is common to all of the signals supplied by the four transducers $PT_A$, $PT_B$, $PT_C$ and $PT_D$. This is the detection instant of the exceeding of the predetermined threshold value $V_s$ by the first of these signals. Following this single instant $t_1$, the instants $t_2$, $t_{2'}$ and $t_{2''}$ are determined for each one of these signals by imposing for example a certain minimum number of successive high values in the digital inputs sampled before a zero crossing so that the latter is effectively considered as a first zero crossing by decreasing values, in such a way as to prevent false detections on the micro-oscillations preceding each main lobe indicative of an impact detection P. This minimum number, indicative of a supposed width of the main lobe of each signal, can be established by calibration and differ according to the signals analysed, according to whether it is a signal directly supplied by a transducer or one of the derivatives thereof. It is thus noted that, for progressive mechanical waves propagating at 5500 m/s in an interactive surface made from polycarbonate, the main lobe of an electrical signal supplied by any of the transducers subsequent to an impact has an expected width of about 2 µs.

According to another possible embodiment, an instant $t_1$ of exceeding the predetermined threshold value $V_s$ could be determined independently for each one of the signals supplied by the four transducers $PT_A$, $PT_B$, $PT_C$ and $PT_D$.

Also alternatively, the instant $t_1$ can be determined by exceeding the threshold $V_s$ of any of the successive derivatives of one or several of the signals supplied by the four transducers $PT_A$, $PT_B$, $PT_C$ and $PT_D$.

In the example shown in FIG. 1, the operation of the electronic central unit 12 such as detailed hereinabove allows for the obtaining of twelve instants of impact detection P identified in the electrical signals received:

the three instants $t_{A,2}$, $t_{A,2'}$ and $t_{A,2''}$ respectively identified in the electrical signal supplied by the transducer $PT_A$, its first derivative and its second derivative, the three instants $t_{B,2}$, $t_{B,2'}$ and $t_{B,2''}$ respectively identified in the electrical signal supplied by the transducer $PT_B$, its first derivative and its second derivative, the three instants $t_{C,2}$, $t_{C,2'}$ and $t_{C,2''}$ respectively identified in the electrical signal supplied by the transducer $PT_C$, its first derivative and its second derivative, and the three instants $t_{D,2}$, $t_{D,2'}$ and $t_{D,2''}$ respectively identified in the electrical signal supplied by the transducer $PT_D$, its first derivative and its second derivative.

Note that, although the instants $t_1$, $t_{A,2}$, $t_{B,2}$, $t_{D,2}$, $t_{D,2}$, $t_{A,2'}$, $t_{B,2'}$, $t_{D,2'}$, $t_{D,2'}$, $t_{A,2''}$, $t_{B,2''}$, $t_{C,2''}$, $t_{D,2''}$ have been described as being detected after sampling by the digital inputs of the calculator 30, the processing of the signals by the elements 14, 16 and 18 can be entirely analogue, in such a way that the detection of these instants themselves could alternatively also be analogue.

In a manner known per se and using calculation formulas that can be pre-established, the calculator 30 is programmed to determine a location, noted for example (x,y) in Cartesian coordinates in a coordinate system linked to the interactive surface 10, from the identified instants $t_{A,2}$, $t_{B,2}$, $t_{C,2}$ and $t_{D,2}$, the propagation speed of the progressive mechanical waves in the interactive surface 10 and locations of the four transducers $PT_A$, $PT_B$, $PT_C$ and $PT_D$. Likewise, it is programmed to determine a locations noted as (x',y') from the identified instants $t_{A,2'}$, $t_{B,2'}$, $t_{C,2'}$ and $t_{D,2'}$. Likewise, it is programmed to determine a location noted as (x",y") from the identified instants $t_{A,2'''}$, $t_{B,2'''}$, $t_{C,2'''}$ and $t_{D,2'''}$. Through generalisation, it is programmed to determine a location noted as $(x^{(N)}, y^{(N)})$ from instants $t_{A,2}^{(N)}$, $t_{B,2}^{(N)}$, $t_{C,2}^{(N)}$ and $t_{D,2}^{(N)}$ which may be identified in N-th derivatives of the signals supplied by the four transducers $PT_A$, $PT_B$, $PT_C$ and $PT_D$.

In theory, the coordinates (x,y), (x',y') and (x",y") should be identical since the quadruplets $(t_{A,2}, t_{B,2}, t_{C,2}, t_{D,2})$, $(t_{A,2'}, t_{B,2'}, t_{C,2'}, t_{D,2'})$, and $(t_{A,2''}, t_{B,2''}, t_{C,2''}, t_{D,2''})$ are theoretically identical to the nearest two constants. In practice, this is never the case, in particular due to the sampling rate of the digital inputs of the calculator 30 and the measurement noise. It is then possible to exploit the redundancies resulting from the twelve identified instants of impact detection P, since only three instants identified from three different transducers are a minima theoretically required. In particular, it is possible to determine a final location $(x_f, y_f)$ by taking an average of the locations (x,y), (x',y') and (x",y"). It is also possible to associate each location (x,y), (x',y') and (x",y") with a likelihood calculation and to take account of this in the calculation of the aforementioned average or for selecting one of the locations.

The likelihood calculation mentioned hereinabove uses for example the fact that for each location (x,y), (x',y'), (x",y") or more generally $(x^{(N)}, y^{(N)})$, more than three transducers are solicited. Thus, for each localisation $(x^{(N)}, y^{(N)})$, with N≥0, it is possible to geometrically determine (by Pythagoras), and by knowing the propagation speed of the progressive mechanical waves in the interactive surface 10, expected theoretical detection instants t-th$_{A,2}^{(N)}$, t-th$_{B,2}^{(N)}$, t-th$_{C,2}^{(N)}$, t-th$_{D,2}^{(N)}$ and to deduce therefrom a likelihood value (squared error or other well-known method) by comparing them to the identified instants $t_{A,2}^{(N)}$, $t_{B,2}^{(N)}$, $t_{C,2}^{(N)}$ and $t_{D,2}^{(N)}$.

The calculator 30 was presented hereinabove in the form of a microprocessor programmed to carry out a certain number of functions that can be implemented using computer programs, i.e. in the form of a computer device. But these functions could also be at least partially micro programmed or micro wired in dedicated integrated circuits. Thus, alternatively, the computer device implementing the calculator 30 could be replaced with an electronic device comprised solely of digital circuits (without computer program) for the carrying out of the same actions.

Each transducer $PT_A$, $PT_B$, $PT_C$ or $PT_D$ of FIG. 1 can be carried out in the form diagrammatically shown in FIG. 3. It comprises a piezoelectric sensor 32 of which the equivalent electrical diagram comprises a source of current 34 mounted in parallel with a capacitor 36. The capacitor 36 is itself connected in parallel with an output load that is purely resistive. This is more precisely a resistor 38 of which the impedance is advantageously less than one tenth the impedance of the capacitor 36 at an average frequency of the progressive mechanical waves from the impact P, i.e. for example at a frequency of about 200 kHz for an interactive surface 10 made of steel. It is astute to choose a resistive load that is as low in relation to the capacitor 36. This makes it possible to prevent an integrating effect and a distortion of the electrical signal supplied by the piezoelectric sensor 32. This results in a better relevance of the instants $t_2$, $t_{2'}$ and $t_{2''}$ of zero crossings identified as instants of impact P detection by the electronic central unit 12, and therefore a better locating. It should be noted that this ingenuity goes against known teaching, for example that of documents U.S. Pat. No. 6,933,930 B2 and U.S. Pat. No. 6,367,800 B1. Indeed, in these documents, the integration and amplification effect produced by a high impedance at the output of the piezoelectric sensor 32 is sought in order to be able to detect low-energy impacts. But this is done at the detriment of the quality of the locating for two reasons: firstly, the frequency of the electrical signals is thus lowered, the rising edges are not as steep and there is less precision on the threshold detection, in particular in the presence of noise or if the signals are highly attenuated; then, the detection instants of the zero crossings are delayed and there is more sensitivity to the echoes or disturbances that appear on the signals in the vicinity of the changes in mechanical properties such as for example the interactive surface edges.

In order to make it possible to detect low-energy impacts in accordance with the invention, if the mounting of FIG. 3 is not suitable, it is possible to carry out each transducer $PT_A$, $PT_B$, $PT_C$ or $PT_D$ of FIG. 1 in the form diagrammatically shown in FIG. 4. The transducer $PT_A$, $PT_B$, $PT_C$ or $PT_D$ comprises as in the preceding example the piezoelectric sensor 32 of which the equivalent electrical diagram comprises the source of current 34 mounted in parallel with the capacitor 36. But the capacitor 36 is connected in parallel this time with an output load comprising an operational amplifier 40 mounted as a current/voltage converter. It has for this a resistor 42 arranged between the output and the inverting input of the operational amplifier 40, with the two inverting and non-inverting inputs of the latter being respectively connected directly to the two terminals of the capacitor 36. This mounting makes it possible to eliminate the integrating role of the capacitor 36 since the voltage at its terminals remains practically zero, with the current generated by the piezoelectric sensor 32 generating in turn a voltage in the resistor 42 that this time can be of a high value and therefore allow for the detection of impacts of low energy.

The operation of the facility of FIG. 1 shall now be detailed in reference to FIG. 5.

At an instant initial t=0, during a first step 100, an impact P generates progressive mechanical waves intended to propagate in all of the directions in the interactive surface 10.

From this initial instant, during a step 102, the four transducers $PT_A$, $PT_B$, $PT_C$ and $PT_D$ capture these progressive mechanical waves and transform them into electrical signals.

In parallel to this step 102, during steps 104, 106, 108, the electronic central unit 12 receives the electronic signals supplied by the transducers $PT_A$, $PT_B$, $PT_C$ and $PT_D$ and its calculator 30 processes them for locating the impact P in the interactive surface 10 by analysing time differences of propagation of these progressive mechanical waves from the impact to each one of the transducers.

More precisely, during the step 104, the calculator 30 triggers an impact detection from an instant when at least one M-th derivative from at least one of the electrical signals received by the electronic central unit 12 exceeds the predetermined threshold value $V_s$. In the example in FIG. 1, this is the first instant $t_1$ when the comparator 16 detects at least one exceeding of the predetermined threshold value $V_s$. From this instant, a memorisation if the digital inputs receiving the outputs of the comparators 20, 22 and 26 is carried out at a sampling frequency during the predetermined maximum duration.

Then, during the step 106, the calculator 30 determines for each electrical signal received from each transducer $PT_A$, $PT_B$, $PT_C$ and $PT_D$, at least one second instant, subsequent to the first instant $t_1$, of the first zero crossing of at least one N-th derivative of this electrical signal. In the example in FIG. 1, this is the twelve second instants $t_{A,2}$, $t_{B,2}$, $t_{C,2}$, $t_{D,2}$, $t_{A,2'}$, $t_{C,2'}$, $t_{D,2'}$, $t_{A,2'''}$, $t_{B,2'''}$, $t_{C,2'''}$, $t_{D,2'''}$ of the first zero crossing of the electrical signals received ($t_{A,2}$, $t_{B,2}$, $t_{C,2}$, $t_{D,2}$=instants when the comparator 20 detects a first zero crossing by decreasing values), of their first derivatives ($t_{A,2'}$, $t_{B,2'}$, $t_{C,2'}$, $t_{D,2'}$=instants when the comparator 22 detects a first zero crossing by decreasing values) and of their second derivatives ($t_{A,2'''}$, $t_{B,2'''}$, $t_{C,2'''}$, $t_{D,2'''}$=instants when the comparator 26 detects a first zero crossing by decreasing values). All of these second instants are identified as instants of impact detection P.

Then, during the step 108, the calculator 30 determines as detailed hereinabove the location of the impact P, for example within Cartesian coordinates in the interactive surface 10, on the basis of the twelve instants of impact P detection identified in the electrical signals received. It is then ready for the detection of another impact (return to step 100).

Note that the calculator 30 can also be configured to measure an impact P energy in addition to its location.

The facility of FIG. 6 is a sports shooting facility that implements, advantageously but optionally, the principles of this invention. This can be compressed air shooting, 22 LR rifle shooting, crossbow shooting, etc.

It comprises:
a target 44 with an interactive surface 46 provided with a locating device for the determining of location values of impacts against the interactive surface: this device advantageously comprises the electronic central unit 12 and the transducers $PT_A$, $PT_B$, $PT_C$, $PT_D$ described hereinabove, but it could also be a device for locating in accordance with the teachings of documents U.S. Pat. No. 6,933,930 B2 or U.S. Pat. No. 6,367,800 B1,
a server 48 for storing location values of impacts located by the device 12, $PT_A$, $PT_B$, $PT_C$ and $PT_D$,
an emitter 50, provided for example in the electronic central unit 12, for the transmission of these location values of impacts from the electronic central unit 12 to the storage server 48, and
a portable device 52 for telephony or personal digital assistance provided with a software application for the downloading and processing of at least one portion of the location values of impacts stored by the server 48 for the purpose of presenting them to a user (display, history and statistical data, etc.).

The storage server 48 communicates with the emitter 50 of the electronic central unit 12 and with the portable device 52 using at least one wired or wireless data transmission network 54. For example, the emitter 50 transmits its data to the storage server 48 according to a wireless communication protocol such as Bluetooth or WiFi and the storage server 48 communicates with the portable device 52 according to a wireless telecommunication protocol.

The interactive surface 46 is for example formed from a rigid sheet metal that resists the energy of the impacts on the back of which the transducers $PT_A$, $PT_B$, $PT_C$ and $PT_D$ are glued. As moreover shown in FIG. 7 as a side view, it can comprise fastening elements 56 and a case 58 at the rear wherein can be arranged the transducers $PT_A$, $PT_B$, $PT_C$ and $PT_D$, the electronic central unit 12 and an autonomous unit 60 for the supply of electrical energy (battery, etc.).

Note finally that at least one portion of the electronic central unit 12, in particular a portion of the calculator 30, can functionally be offset on the portable device 52 for telephony or personal digital assistance since the latter has its own computing capacities.

The facility of FIG. 8 is an archery shooting facility that implements, advantageously but optionally, the principles of this invention.

It comprises:
a support 62 for stable maintaining on the ground, for example an easel,
a target 64 with an interactive surface 66 provided with a device for locating an impact against the interactive surface: this device advantageously comprises the electronic central unit 12 and the transducers $PT_A$, $PT_B$, $PT_C$, $PT_D$ described hereinabove, but it could also be a device for locating in accordance with the teachings of documents U.S. Pat. No. 6,933,930 B2 or U.S. Pat. No. 6,367,800 B1,
at least one arrow 68 of which one end 70, intended to reach the interactive surface 66 of the target 64, is provided with a tip 72 for damping the impact, for example a tip made of plastic or rubber of the "blunt tip" type that makes it possible to not damage the interactive surface 66.

Optionally, the target 64 can comprise a first conventional plate 74 formed from straw or from dense foam against a front face of which the interactive surface 66 is arranged in the form of a second transparent protective plate, for example made of polycarbonate.

Thus for training and so as to limit the wear of the conventional plate 74, the transparent protective plate 66 can be arranged against its front face and be fixed to the support 62. A visual marking on this protective plate 66 allows for example a centring in relation to the conventional plate 74 on the front face of which is displayed a marker of the target. The transducers $PT_A$, $PT_B$, $PT_C$, $PT_D$ are then positioned at the four corners of the protective plate 66. The arrow 68, when it reaches the target 64, bounces off the transparent protective plate 66 but the point of impact can be located as detailed hereinabove.

For competitions, the transparent protective plate 66 can be removed and the target 64 then comprises only the conventional plate 74.

Also note that, as in the preceding example, the impact locations can be transmitted in real time to a portable device for telephony or personal digital assistance provided with a suitable software application, which thus allows a user to immediately see the result of his shots and his training statistics. In a preferred embodiment, for increased realism, an arrow in perspective instead of a simple point of impact can be displayed on the portable device. The shape of the signal measured by the transducers $PT_A$, $PT_B$, $PT_C$, $PT_D$ can in particular provide an idea of the orientation of the arrow.

It clearly appears that a device for locating an impact against an interactive surface such as the one described hereinabove makes it possible to improve the performance of a locating technology through the detection of progressive mechanical waves and analysing time differences of propagation.

It also clearly appears that shooting facilities such those described hereinabove very substantially improve the technical possibilities of interaction, by cleverly exploiting the interest of a locating technology by detection of progressive mechanical waves and analysing time difference of propagation, with or without the improvements in performance supplied by the device of FIG. 1.

Note moreover that the invention is not limited to the embodiments described hereinabove. It will appear to those skilled in the art that various modifications can be made to the embodiments described hereinabove, in light of the teaching that has just been disclosed to them. In the presentation of the invention which is made hereinabove between page 4 line 18 and page 8 line 5, the terms used must not be interpreted as limiting the invention to the embodiments disclosed in this description, but must be interpreted so as to include therein all of the equivalents of which the projection is within the scope of those skilled in the art by applying their general knowledge to the implementation of the teaching that has just been disclosed to them.

The invention claimed is:

1. A device for locating an impact against an interactive surface able to propagate progressive mechanical waves from the impact, comprising:
   at least three transducers arranged and distributed against the interactive surface, the at least three transducers being configured to capture the progressive mechanical waves propagating in the interactive surface and to transform the progressive mechanical waves into electrical signals, and
   a processor, connected to the transducers in order to receive the electrical signals from the at least three transducers, configured to:
      locate the impact (P) in the interactive surface by analyzing propagation time differences of progressive mechanical waves from the impact to the transducers on the basis of instants of impact detection identified in the electrical signals received,
      trigger an impact detection from a first instant when at least one M-th derivative from at least one of the received electrical signals exceeds a predetermined non-zero threshold value, where M is a positive integer or zero, and
      after triggering the impact detection:
      determine, for each electrical signal received from each transducer, several second instants, subsequent to the first instant, of several first zero crossings of several respective n-th derivatives of the electrical signal, where 0≤n≤N and N is a positive integer,
      identify, for each electrical signal received from each transducer, several instants of impact detection in the electrical signal from the determined second instants, wherein each instant of impact detection is respectively related to each one of the several n-th derivatives of the electrical signal,
      deduce from the several instants of impact detection several possible locations of the impact, wherein each possible location is respectively related to each one of the several n-th derivatives of the electrical signals received from the at least three transducers, and
      determine a final location by at least one of averaging said several possible locations or optimizing a likelihood criterion on said several possible locations.

2. The device for locating an impact according to claim 1, wherein each transducer is a piezoelectric sensor having a capacitor and an output load mounted in parallel such that:
   an output load is purely resistive and an impedance is less than one tenth of an impedance of the capacitor at an average frequency of the progressive mechanical waves from the impact, or
   the output load comprises an operational amplifier mounted as a current/voltage converter.

3. The device for locating an impact according to claim 1, wherein the processor is configured to trigger the impact detection by memorizing sampled values of at least one signal from at least one zero comparator of said several n-th derivatives of each electrical signal received from each transducer, during a predetermined maximum duration.

4. The device for locating an impact according to claim 1, comprising at least four transducers arranged and distributed against the interactive surface, wherein the processor is further configured to:
   from at least one determined location of the impact, determine, geometrically and by knowing a propagation speed of the progressive mechanical waves in the interactive surface, expected theoretical instants of detection the impact by each one of the transducers,
   compare the theoretical instants of impact detection to the identified instants of impact detection, and
   deduce therefrom a likelihood value of said at least one location.

5. A sports shooting facility comprising:
   a target with an interactive surface,
   a device for locating an impact according to claim 1, configured to determine location values of impacts against the interactive surface of the target,
   a server configured to store said location values of impacts,
   an emitter, configured to transmit said location values of impacts from the processor of the device for locating to the storage server, and
   a portable device for telephony or personal digital assistance provided with a software application and configured to download and process at least one portion of the location values of impacts stored by the server for the purpose of presenting them to a user.

6. An archery shooting facility comprising:
   a target with an interactive surface,
   a device for locating an impact according to claim 1, and
   at least one arrow of which one end, configured to impact the interactive surface of the target, is provided with a tip for damping the impact.

7. The archery shooting facility according to claim 6, wherein the target comprises:
   a first plate disposed on one front face of which is displayed a marker of the target, and
   a second transparent protective plate arranged against the front face of the first plate, the second transparent protective plate comprising the interactive surface and having a visual marker allowing for a centering with respect to the marker of the target.

8. A method for locating an impact against an interactive surface to propagate progressive mechanical waves from the impact, comprising:
   capturing, using at least three transducers arranged and distributed against the interactive surface, the progressive mechanical waves propagating in the interactive surface and transforming the progressive mechanical waves into electrical signals, and
   locating an impact in the interactive surface, using a processor connected to the transducers in order to receive the electrical signals from the at least three transducers, by analyzing propagation time differences of progressive mechanical waves from the impact to the transducers on the basis of instants of impact detection identified in the electrical signals received,
   wherein the locating of the impact comprises:
      triggering an impact detection from a first instant when at least one M-th derivative from at least one of the electrical signals received by the processor exceeds a predetermined non-zero threshold value, where M is a positive integer or zero, and after triggering the impact detection:
- determining, for each electrical signal received from each transducer, several second instants, subsequent to the first instant, of several first zero crossings of several respective n-th derivatives of the electrical signal, where $0 \leq n \leq N$ and N is a positive integer,
- identifying, for each electrical signal received from each transducer, several instants of impact detection in the electrical signal from the determined second instants, wherein each instant of impact detection is respectively related to each one of the several n-th derivatives of the electrical signal,
- deducing therefrom several possible locations of the impact, wherein each possible location is respectively related to each one of the several n-th derivatives of the electrical signals received from the at least three transducers, and
- determining a final location by at least one of averaging said several possible locations or optimizing a likelihood criterion on said several possible locations.

9. A non-transitory computer-readable medium encoded with computer-readable instructions that, when executed by a processor, cause the processor to perform the method according to claim 8.

10. The archery shooting facility according to claim 7, wherein the first plate is made of straw.

11. The device for locating an impact according to claim 1, wherein the at least three transducers are arranged adjacent to at least three different corners of the interactive surface.

* * * * *